United States Patent Office 3,236,747
Patented Feb. 22, 1966

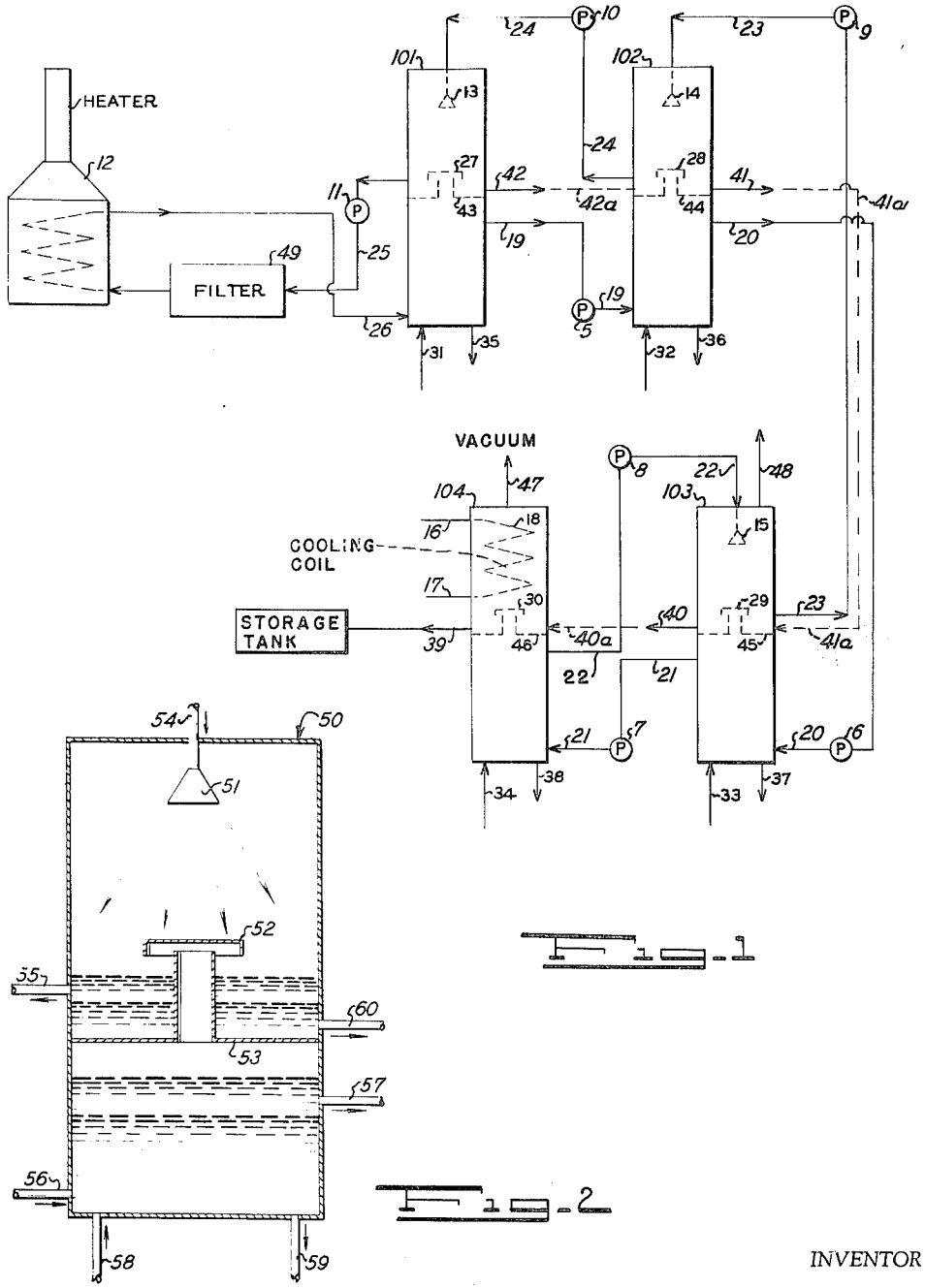

3,236,747
PROCESS FOR SEPARATING VOLATILE MATERIAL FROM A LIQUID MIXTURE BY A SERIES OF VAPORIZATION STAGES
Irwin B. Margiloff, New York, N.Y., assignor to Halcon International, Inc., a corporation of Delaware
Filed Feb. 21, 1962, Ser. No. 174,842
2 Claims. (Cl. 203—11)

This invention relates to an improved process for the separation of a volatile material from a scale-forming or corrosive mixture thereof by vaporization of at least some of the material, followed by separating and condensing the vapors and recovering the condensate, more particularly to such a process wherein the heating is directly by means of a heat transfer fluid which is substantially inert and immiscible with the liquid it contacts. The process relates especially to a multiple stage procedure wherein the spent heating fluid from the first stage is used as the heating fluid for the next stage, and so on through the series of stages, and in at least some of the stages the cooled heating fluid is used as the condensing fluid, flowing in a reverse direction through the stages, whereby heat economy is achieved. Impediment of heat transfer by scale formation is eliminated, as is the high cost of providing corrosion-resistant materials for heat transfer.

The invention also relates to apparatus suitable for use in the process, including one or more vessels, each having a lower evaporating zone and an upper condensing zone with appropriate raw material feed and draw-off means, heating-fluid feed and draw-off means, cooling-fluid feed and draw-off means, and condensate draw-off means. For a multiple stage process, a plurality of vessels is arranged in series, with appropriate connections for passing spent heating fluid from the first vessel to the next vessel, and so on in sequence, and connections for passing spent cooling oil from a vessel along in the series to the condensing zone of the next preceding vessel wherein it acts as the cooling fluid.

Various vaporization and multiple stage flash processes are used commercially for the removal of large quantities of solvent per unit of heat supply. In the case of materials which contain scale-forming ingredients or corrosive materials, costly materials of construction are required and continuous operation is difficult due to the formation of scale which impedes heat transfer therein. Scale formation is so serious an operating problem in the production of potable water from sea water that the acceptable upper temperature limit in the evaporative process is about 250° F., and in some practical operations it is about 200° F. The art is confronted by the problem of providing improved processes and apparatus for such processes which avoid these difficulties.

The discoveries associated with the invention and relating to the solution of the above problems, and the objects achieved in accordance with the invention as set forth herein include the provision of:

A process for the separation of volatile material from a liquid mixture containing the same, (and being corrosive or scale-forming or otherwise tending to interfere with the operation of solid heat-exchange surfaces) which comprises heating a portion of said mixture in a zone to vaporize at least some of said material, separating, condensing said vapors, and recovering the condensate, said heating being direct by means of a heat transfer fluid immiscible with the liquid it contacts;

Such a process wherein the vapors are condensed by direct and intimate contact with a heat transfer fluid immiscible with the liquid it contacts;

Such a process followed by heating another portion of said mixture in a subsequent zone to vaporize at least a portion of said material, separating and condensing the resulting vapors, the heating in this zone being by means of spent heating fluid from the preceding zone, and the condensing being by means of heat transfer fluid which enters the condensing zone at a temperature somewhat below the saturation temperature of the vapors, the spent condensing fluid being passed as condensing fluid to the next preceding zone;

Such a process wherein the mixture is saline water and the heat-exchange fluid is a petroleum oil, the two fluids separating into an upper oil layer and a lower aqueous layer;

Such a process wherein the initial temperature of the heating fluid introduced into the first zone is 330° F.;

Such a process including four stages in series, the vaporizing temperatures thereof being 270° F., 220° F., 170° F., and 120° F., the vapor pressures being 42 p.s.i.a., 17 p.s.i.a., 6 p.s.i.a., and 1.7 p.s.i.a., respectively, the last two stages being at subatmospheric pressures;

Such a process wherein the heat transfer fluid is a petroleum fraction having a specific gravity of 0.8, a specific heat of 0.5, a mean average boiling point of 600° F., and a characterization factor of 12;

Such a process wherein the feed rate of saline water to each zone is 10,000 lbs. per hour, and the rate of production of water vapor in each zone is 1,000 lbs. per hour;

Such a process wherein the heat-exchange fluid contains a suspension of 30% by volume of nickel, giving it an average density of 3.2 and an average specific heat of 0.18, this fluid forming a lower layer and water forming the upper layer;

Such a process wherein the feed mixture is a weak waste calcium chloride brine and it is converted to a more concentrated brine;

An apparatus adapted for the evaporation of a volatile constituent from a scale-forming or corrosive mixture thereof comprising in combination a vessel containing a lower evaporating zone and an upper condensing zone, tray and cap means separating said zones, feed inlet and spent feed draw-off means connected with the vaporization zone, heating fluid feed means and spent heating fluid draw-off means connected with said vaporization zone, spray inlet means for cooling fluid in the upper part of the condensing zone, spent condensing fluid draw-off means connected with the condensing zone and condensate draw-off means connected with the condensing zone; off from the first condensing zone;

Such an apparatus including at least one subsequent vessel similar to the first, a connecting line for passing spent heating fluid from the first vessel to the vaporization zone of the second vessel, and a connecting line for passing spent condensing fluid from the subsequent vessel to the condensing zone of the next preceding vessel;

Such an apparatus including 3 vessels in series;

Such an apparatus including a fourth vessel in series, said vessel being provided with indirect cooling means in the upper condensing zone;

Such an apparatus wherein the cooling means is a coil;

Such an apparatus provided with a connecting line for passing product from the first condensing zone into the second condensing zone, and product from the second condensing zone into the third condensing zone, and product from the third condensing zone into the fourth condensing zone;

Such an apparatus provided with heat-transfer-fluid heating means, a connecting line between the spent cooling fluid draw-off from the first condensing zone and the feed to said heating means, and a connecting line from the draw-off from said heating means to the heat-transfer-fluid feed means to the first zone;

Such an apparatus provided with a filter between the feed inlet to the heater and the spent cooling fluid draw-off from the first condensing zone;

And other objects which will be apparent as details of embodiments of the invention are set forth hereinafter.

In the accompanying drawing, FIGURE 1 is a schematic illustration of a preferred multistage embodiment of the invention, and FIGURE 2 is a schematic illustration of a single stage embodiment of the invention as well as of a unit suitable for use in the multistage embodiment.

In order to indicate still more fully the nature of the present invention, the following examples of typical procedures are set forth in which parts and percents mean parts and percents by weight, respectively, unless otherwise indicated, it being understood that these examples are presented as illustrative only and they are not intended to limit the scope of the invention.

In FIGURE 1 are shown four evaporating vessels 101, 102, 103 and 104 with oil pumps 5, 6, 7, 8, 9, 10 and 11, oil heater 12, spray heads 13, 14 and 15, water pipes 16 and 17 and water cooled condenser coil 18, oil pipes 19, 20, 21, 22, 23, 24, 25 and 26, vapor passing caps 27, 28, 29 and 30, feed pipes 31, 32, 33, and 34, waste pipes 35, 36, 37 and 38, product draw-off pipes 39, 40, 41 and 42, trays 43, 44, 45, and 46, vacuum lines 47 and 48, and filter 49.

In FIGURE 2, the vessel 50 is equipped with spray head 51, caps 52, tray 53, oil pipes 54, 55, 56 and 57, feed pipe 58, waste draw-off pipe 59, and product draw-off pipe 60. A hot oil is supplied to vessel 50 through pipe 56. The oil is immiscible in the water or solvent to be evaporated. The oil contacts the solution and is intimately mixed therewith in the lower part of vessel 50, vaporizing a portion of it, and rising to the surface. It is withdrawn through pipe 57. Feed solution is supplied and withdrawn through pipes 58 and 59 respectively.

The vapors rise around cap 52 into the upper section of vessel 50 where they are contacted with a stream of relatively cool oil supplied through pipe 54 and sprayed by spray head 51. This stream of relatively cool oil condenses the rising vapors which collect as a layer on tray or plate 53. The oil is lighter than the water or solvent being separated, and it separates from the water or solvent as a distinct layer, permitting each layer to be separated from the other by decantation.

The product water or solvent is withdrawn through pipe 60, while the oil, warmed by the condensation of the solvent, leaves through pipe 55. If the oil were replaced by a fluid which is heavier than the solvent, the draw-off of solvent would be through pipe 55, and the other fluid through pipe 60.

Thus, in the operation of a single or typical stage, the sensible heat in the incoming heating oil is converted to latent heat in the production of vapors of water or solvent, and this latent heat is reconverted to sensible heat upon condensation of the vapors upon the incoming coolant oil (or other cooling means).

Referring now to FIGURE 1, the method whereby the process may be adapted to multiple stages will be described.

Hot oil from heater 12 enters vessel 101, cools partially by vaporizing part of the solution therein, is removed through pipe 19 and pump 5 supplies it to vessel 102. The oil cools again partially, and is removed through pipe 20 and pump 6 and passed to vessel 103. The process is repeated here and in vessel 104. The oil leaving vessel 104 is pumped by pump 8 through pipe 22 to spray head 15 in vessel 103 where it serves as coolant for vapors of solvent. After being warmed by the condensation of vapors, it is decanted and pumped to vessels 102 and 101 and by pumps 9 and 10, in turn being heated in each vessel by condensation of vapors. Pump 11 supplies it to heater 12 through filter 49 which removes scale and foreign matter picked up and carried through the oil circuit of the process.

Feed solutions enter the vessels through pipes 31, 32, 33 and 34. After vaporization of part of the solvent, the remaining solutions leave through pipes 35, 36, 37 and 38. The vaporized portions pass as vapors through plates or trays 43, 44, 45 and 46 and around caps 27, 28, 29 and 30 into the condensing sections. Condensates are withdrawn through pipes 42, 41, 40 and 39. At the lowest temperatures in vessels 103 and 104, the operating pressures may be subatmospheric. Hence the use of vacuum to remove non-condensibles through pipes 47 and 48. In vessel 104 water admitted through pipe 16, circulated through coil 18, and withdrawn through pipe 17, serves as the low temperature coolant in the process. In vessels 103, 102 and 101 in turn, the oil from vessel 104 is reheated.

The feed solution may be supplied to vessels 101, 102, 103 and 104 cold or after heat exchange with the condensate and waste solutions, or the streams of waste and condensate may be fed and flashed from vessel to vessel in recognized patterns to aid the conservation of thermal energy. Usual heat exchange devices and patterns of feeding and interstage flashing (not shown) may also be used, e.g. between feed lines and waste draw-off lines, and the like.

EXAMPLE 1

Into vessels 101, 102, 103 and 104 are fed per hour preheated streams of 10,000 lbs. each of dilute solutions of salts, namely, sea water. A hot petroleum oil fraction with a specific gravity of 0.8, a specific heat of 0.5, the means average boiling point of 600° F., and a characterization factor of 12 flows through the lower portion of the series of vessels from the heater, entering vessel 101 at 330° F., leaving vessel 101 and entering vessel 102 at 280° F., leaving vessel 102 and entering vessel 103 at 230° F., and leaving vessel 103 and entering vessel 104 at 180° F. The flow rate of oil is 40,000 lbs. per hour, and it is well mixed with the solution giving large heat-exchange surface area.

In each of the vessels, 1,000 lbs. per hour of water vapor is produced. The temperatures of the boiling solutions are 270° F., 220° F., 170° F., and 120° F., and the vapor pressures are 42 p.s.i.a., 17 p.s.i.a., 6 p.s.i.a., 1.7 p.s.i.a. in vessels 101, 102, 103 and 104 respectively. Vessels 103 and 104, being subatmospheric, require vacuum means to eject non-condensibles.

In each of the condensing sections of vessels 101, 102 and 103, the oil regains most of the heat required to produce vapor in the boiling section so that the oil leaving vessel 104 is at 130°F., and rises in vessel 103 to 180° F., in vessel 102 to 230° F., and in vessel 101 to 280° F., before being filtered and reheated in the oil heater of conventional design.

As an added improvement, the condensate from vessel 101 is passed via lines 42 and 42a to the condensing zone of vessel 102, the condensate from the latter is passed via lines 41 and 41a to the condensing zone of vessel 103, and the condensate from the latter is passed via lines 40 and 40a to the condensing zone of vessel 104. Further heat economy is achieved thereby, as the withdrawal of condensate is made to take place at a minimum temperature.

What is accomplished is the transfer of heat to a corrosive and scale-producing fluid, e.g. sea water, without the use of solid or indirect heat transfer surface so that scale, if produced, will be taken out suspended in the heating oil or in the waste brines, and also so that expensive materials of construction required to combat the corrosive characteristics of sea water (or of scale-control chemicals) need not be used for relatively costly heat transfer surface. Mechanical distortion problems are avoided. In fact, the vessels themselves can be built of less expensive materials with increased allowance for corrosion. Impediment of heat transfer due to scale formation is eliminated.

Because the upper limits of temperature have been raised, the pressure differential between stages at higher temperatures becomes great enough to permit the use of let-down devices such as turbines in the oil streams flowing toward lower temperatures, which may be used to drive the pumps required to move the oil streams being heated into the successive stages toward the oil heater.

The stagewise process may be extended to any convenient number of stages.

Devices such as centrifugal separators may be used to separate the coolant oils in the condensing sections from the condensates there produced. Well-known physical methods such as adsorption are available to remove trace amounts of heat-transfer fluid from the condensate and waste solutions, if desired.

This multiple stage process is incorporated into a plant for producing fresh water from sea water or other saline solutions, and surprising economies are achieved in operation as well as in initial cost.

Corresponding relative improvements are achieved in a single stage operation, following the system of FIGURE 2.

EXAMPLE 2

The multiple stage process of Example 1 is incorporated in a plant for concentrating natural brines as an adjunct to a chemical plant requiring more concentrated brines, e.g. sodium bromide, and similar improvements are achieved.

EXAMPLE 3

The multiple stage process of Example 1 is incorporated in a plant for concentrating weak alkali liquors, from the treatment of aluminum ores, or for reconcentrating weak acid liquors from the hydrolysis of sulfuric acid esters of olefins, and similar results are obtained.

EXAMPLE 4

The multiple process of Example 1 is incorporated in a plant for concentrating aqueous streams to minimize pollution, or to permit the operation of subsequent processes such as combustion or digestion, e.g. in wood pulp or sewage plants, and similar advantages are obtained.

EXAMPLE 5

The multiple stage process of Example 1 is incorporated in a plant for concentrating chemical products produced as dilute corrosive and scale-forming solutions but required at higher concentrations, e.g. dilute calcium chloride liquors from the lime-soda process for the production of soda ash are concentrated from about 10 percent to 40 percent, scale and sodium chloride being removed from the circulating oil streams with no problem due to scale formation on heat-exchange surfaces.

The heat-transfer fluid may be a suspension of solid particles in a liquid vehicle, the suspended materials being used to adjust specific gravity and heat capacity to optimize the separability of the fluid from the solution treated or the condensate and also to optimize the amount of pumping.

The essentially inert and immiscible heating fluids may be pure materials, solutions, metals, alloys, or suspensions.

A wide range of density difference may be produced by using in the presence of light solvents relatively dense fluids such as liquid metals or concentrated solutions. These substances generally have low specific heat; e.g., mercury has a density of 13.6, making it easily separable, but its specific heat of 0.033 requires a relatively large weight of heat transfer fluid to flow for a given heating duty and drop in temperature. The fluid used may be of higher or of lower specific gravity than the condensate, with appropriate modification as to the fluid draw-off lines.

EXAMPLE 6

It is desired to decrease the volume flow rate of oil contacting a solution and to increase its density. The oil vehicle to be used has a specific heat of 0.5 and a specific gravity of 0.8. A suspension of finely divided nickel is made in this oil, the suspension containing 30 percent by volume of nickel, (specific gravity of 8.9, specific heat 0.10). The slurry has an average specific gravity of 3.2 and an average specific heat of 0.17. In separating the two phases in the vaporizing and condensing sections, the slurry is useful. The volumetric flow rate of heat transfer medium is decreased, for the same heating load and temperature ranges, by 26 percent (the density being quadrupled).

It should be noted that the oil-and-solvent and oil-and-solution separations may be performed by gravity separations where possible, either inside the vessels or externally or, if emulsions tend to form, or disparities exist between flow rate of the various fluids, mechanical aids such as centrifugal separators may be used.

In view of the foregoing disclosures, variations and modification thereof will be apparent to one skilled in the art, and it is intended to include within the invention all such variations and modifications except as do not come within the scope of the appended claims.

What is claimed is:

1. A process for the separation of volatile material from a liquid mixture in a plurality of stages in series from the first to the last, each stage having a vaporization zone and a spray condensation zone in connection therewith, the vaporization zone and the condensation zone in each stage having substantially the same pressure, which process comprises:

in a first vaporization zone contacting said liquid mixture with a hot heat transfer fluid, said fluid being immiscible with said liquid mixture, thereby vaporizing at least a portion of said volatile material and partially cooling said heat transfer liquid;

permitting said partially cooled heat transfer liquid and residual mixture to stratify and separating the same;

passing said partially cooled heat transfer liquid to the next succeeding vaporization zone and contacting said liquid mixture therein with said heat transfer fluid thereby vaporizing at least a portion of said volatile material and partially cooling said heat transfer liquid;

spraying cooled heat transfer liquid from the next succeeding condensation zone and contacting said spray with said vaporized volatile material in the condensation zone, thereby condensing said volatile material and partially warming said cooled heat transfer liquid;

permitting said partially warmed heat transfer liquid and volatile material to stratify and separating the same;

passing said partially warmed heat transfer liquid to the next preceding condensation zone;

withdrawing warmed heat transfer liquid from the condensation zone of said first stage and separately heating the same and then passing the heated heat transfer liquid to the vaporization zone of said first stage as said hot heat transfer liquid;

withdrawing cooled heat transfer liquid from the vaporization zone of said last stage, and passing said cooled heat transfer liquid to the condensation zone of the penultimate stage as the cold heat transfer liquid, said heat transfer liquid flowing in a single closed circuit by stages from said last stage to said first stage, and cooling the vaporized volatile material in said last stage by external means.

2. The process of claim 1 wherein the pressure maintained in each stage is higher than the next succeeding stage.

(References on following page)

References Cited by the Examiner
UNITED STATES PATENTS

| | | | |
|---|---|---|---|
| 1,547,893 | 7/1925 | Bergius | 202—74 X |
| 1,986,431 | 1/1935 | Gray | 202—46 X |
| 2,151,990 | 3/1939 | Ruys | 202—74 |
| 2,315,422 | 3/1943 | Hildebrandt | 202—74 |
| 2,502,485 | 4/1950 | Saunders et al. | 202—74 X |
| 2,749,094 | 6/1956 | Lewis et al. | 202—158 |
| 2,976,224 | 3/1961 | Gillian | 202—74 X |
| 3,032,482 | 5/1962 | Shoemaker | 202—74 |

NORMAN YUDKOFF, *Primary Examiner.*